(12) United States Patent
Gauthier

(10) Patent No.: US 9,193,251 B2
(45) Date of Patent: Nov. 24, 2015

(54) POWER TRAIN FOR A HYBRID VEHICLE

(75) Inventor: Pierre Gauthier, Chaville (FR)

(73) Assignee: Technoboost, Paris (FR)

( * ) Notice: Subject to any disclaimer, the term of this patent is extended or adjusted under 35 U.S.C. 154(b) by 765 days.

(21) Appl. No.: 13/501,957

(22) PCT Filed: Oct. 11, 2010

(86) PCT No.: PCT/FR2010/052150
§ 371 (c)(1),
(2), (4) Date: May 17, 2012

(87) PCT Pub. No.: WO2011/045519
PCT Pub. Date: Apr. 21, 2011

(65) Prior Publication Data
US 2013/0042602 A1    Feb. 21, 2013

(30) Foreign Application Priority Data
Oct. 15, 2009    (FR) ...................................... 09 57216

(51) Int. Cl.
*F16D 31/00*    (2006.01)
*B60K 6/12*    (2006.01)

(52) U.S. Cl.
CPC ........................................ *B60K 6/12* (2013.01)

(58) Field of Classification Search
CPC ............................ B60K 6/12; B60K 2006/126
USPC ...................................... 60/414, 451; 180/165
See application file for complete search history.

(56) References Cited

U.S. PATENT DOCUMENTS

| 5,495,912 A * | 3/1996 | Gray et al. ..................... 180/165 |
| 7,107,767 B2 * | 9/2006 | Frazer et al. ..................... 60/414 |
| 7,125,362 B2 * | 10/2006 | Beaty et al. ......................... 477/3 |
| 7,146,266 B2 * | 12/2006 | Teslak et al. ..................... 701/69 |
| 7,391,129 B2 * | 6/2008 | Chiao et al. ..................... 307/9.1 |
| 7,597,172 B1 | 10/2009 | Kovach |
| 2005/0164827 A1 | 7/2005 | Beaty |
| 2009/0095549 A1 | 4/2009 | Dalum |
| 2009/0127011 A1 * | 5/2009 | Zhang ........................ 180/65.28 |

FOREIGN PATENT DOCUMENTS

| DE | 102006036846 A1 | 2/2008 |
| DE | 102008026515 A1 | 12/2009 |
| FR | 2613016 A1 | 9/1988 |
| GB | 2002862 A | 2/1979 |
| WO | 9847732 A1 | 10/1998 |
| WO | 9921263 A2 | 4/1999 |

OTHER PUBLICATIONS

International Search Report corresponding to Pat. App. No. PCT/FR2010/52150, mailed Feb. 2, 2011.

* cited by examiner

*Primary Examiner* — Dwayne J White
*Assistant Examiner* — Logan Kraft
(74) *Attorney, Agent, or Firm* — Polster Lieder

(57) ABSTRACT

The invention relates to a power train for a hybrid vehicle, comprising two hydraulic machines (20, 22) including variable displacement, both of which are connected to a hydraulic pressure accumulator (24) which stores energy, a first hydraulic machine (20) being permanently connected to an internal combustion traction engine (2), and a second hydraulic machine (22) being connected, also permanently, to drive wheels (8) of the vehicle, characterized in that the two hydraulic machines (20, 22) are also interconnected by a linking means (10) that can be engaged or disengaged.

10 Claims, 3 Drawing Sheets

POWER TRAIN FOR A HYBRID VEHICLE

CROSS-REFERENCE TO RELATED APPLICATIONS

This application is the US National Stage, under 35 U.S.C. 371, of International App. No. PCT/FR2010/052150, which was filed on Oct. 11, 2010 and claims priority to French Application No. 0957216, which was filed on Oct. 15, 2009, and which is incorporated herein by reference.

STATEMENT REGARDING FEDERALLY SPONSORED RESEARCH

Not Applicable.

BACKGROUND

The present invention relates to a powertrain for a hybrid vehicle using hydraulic power as an energy storage device, and a hybrid vehicle equipped with such a powertrain.

A conventional hybrid vehicle uses an internal combustion engine as the main motorization, and a hydraulic machine connected to the combustion engine, which can function as a motor or a pump to either charge hydraulic pressure accumulators, or to supply mechanical power to drive wheels of the vehicle by drawing energy from the accumulators.

In this way, the hydraulic machine can be used as a pump during the braking phases to recharge the pressure accumulators, thereby recovering the kinetic energy of the vehicle. During the acceleration phases, the hydraulic machine can also be used as a motor by drawing pressurized fluid from the accumulator to supply mechanical power in addition to the power supplied by the combustion engine.

The use of the energy storage device optimizes the operation of the combustion engine and reduces its consumption and polluting emissions.

A known refinement of these hybrid vehicles, in particular disclosed in document US-A1-20090036248, includes a first hydraulic machine connected to the combustion engine, and a second hydraulic machine connected to one element of a planetary gear system, while one of the two other elements of the planetary gear system is connected to the drive wheels of the vehicle and the other element to the combustion engine.

In this arrangement, the two hydraulic machines can be used in parallel operating mode, whereby the hydraulic machines and the combustion engine can simultaneously drive the drive wheels of the vehicle through a mechanical power transmission.

However, this arrangement is not conducive to serial operating mode because the two hydraulic machines are permanently mechanically coupled to each other. On the one hand, this allows recharging of the pressure accumulators by the combustion engine through a first hydraulic machine. On the other hand, this allows use of the stored energy in independent manner to provide traction to the vehicle through the second hydraulic machine at suitable rotational speeds for each machine, which can be regulated independently to optimize the operating points.

SUMMARY

The present invention eliminates the disadvantages of the prior art, and provides a simple and effective solution for creating a powertrain for a hybrid vehicle, allowing for the use of the two hydraulic machines in serial or parallel mode.

To this end, a powertrain for a hybrid vehicle includes two variable displacement hydraulic machines, both of which are connected to a hydraulic pressure accumulator which stores energy. The first hydraulic machine permanently connects to the driving combustion engine, and the second hydraulic machine permanently connects to the drive wheels of the vehicle. In addition, the two hydraulic machines connect to each other with a coupling element that can be engaged and disengaged.

One advantage of the powertrain is that a first parallel type operating mode can be obtained by engaging a coupling element, so that the drive wheels are driven directly by the combustion engine, with parallel assistance from the hydraulic machines. A second serial type operating mode disengages the coupling element so that the two hydraulic machines work independently.

In addition, the powertrain can include one or more of the following characteristics, which can be combined with each other.

Advantageously, the two hydraulic machines connect to each other by a two-piece shaft, which connect through the coupling element. The first part of the shaft connects to the combustion engine, and the second part connects to the drive wheels.

Advantageously, the coupling element includes an engagement device, such as a mechanical coupling or clutch, actuated by a controlled actuator and controlled by a control unit.

Advantageously, a control unit controls the variable displacement of the hydraulic machines and the combustion engine.

The control unit adjusts the variable displacement of each hydraulic machine used as pump or motor, as a function of the desired torque on the shaft and of the pressure difference between high and low pressure supply circuits of the hydraulic machines.

Advantageously, the high pressure circuit connects to a hydraulic motor with the variable displacement controlled by the control unit to drive accessories.

A method for operating a powertrain including any of the preceding characteristics is also disclosed. In this method, the coupling element is disengaged in serial operating mode and the variable displacements of the first hydraulic machine are used as a pump, and of the second hydraulic machine used as motor is controlled by the control unit.

Furthermore, the powertrain operates in a parallel operating mode by engaging the coupling element and controlling with the control unit the variable displacements of the hydraulic machines.

In the parallel operating mode, the operating method uses the two hydraulic machines simultaneously to supply either high traction torque or high braking force to the drive wheels.

A hybrid vehicle with a powertrain comprising two variable displacement hydraulic machines is also disclosed. Both hydraulic machines are connected to a hydraulic accumulator for storing energy. In addition, the powertrain includes any of the preceding characteristics noted above.

The foregoing and other features, and advantages of the disclosure as well as embodiments thereof will become more apparent from the reading of the following description in connection with the accompanying drawings.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
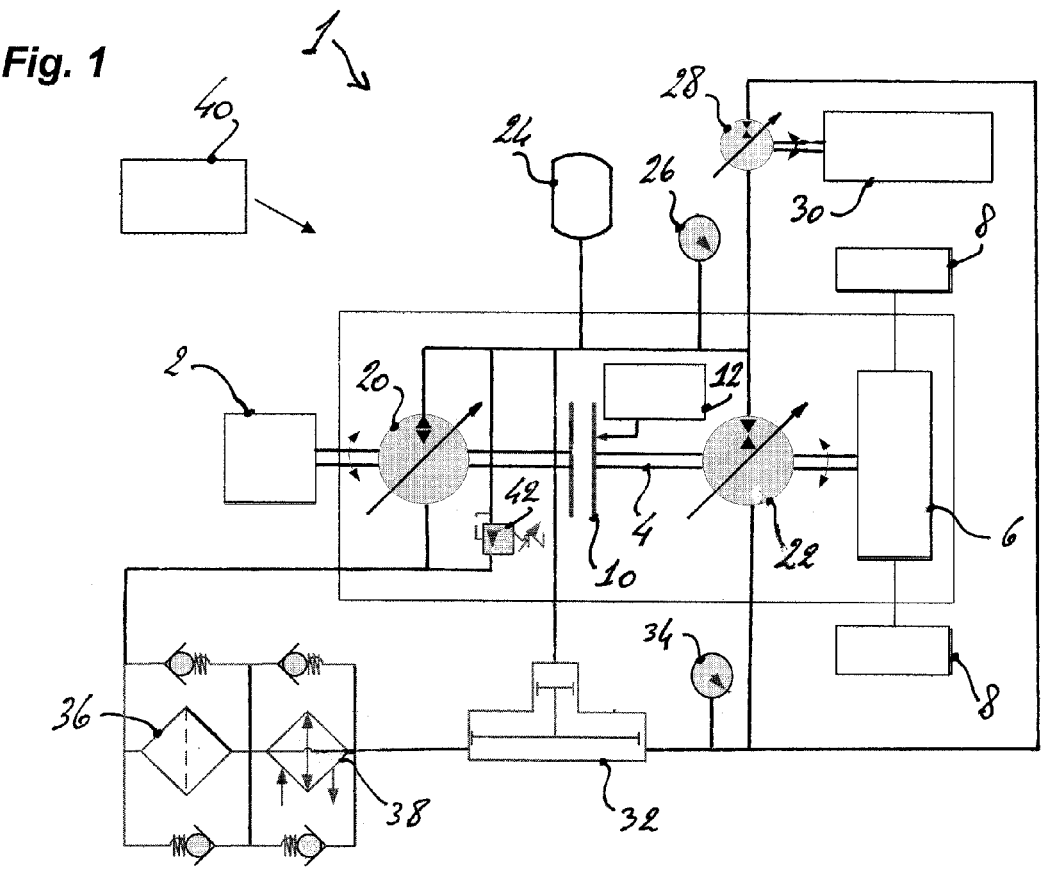
FIG. 1 is a diagram of a powertrain comprising a hydraulic circuit of a hybrid vehicle.

The following detailed description illustrates the claimed invention by way of example and not by way of limitation. The description clearly enables one skilled in the art to make and use the claimed invention, describes several embodiments, adaptations, variations, alternatives, and uses of the claimed invention, including what is presently believed to be the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

FIG. 1 shows a schematic of a powertrain 1 of an automotive vehicle, having a combustion engine 2 driving a mechanical transmission 6 with a motor shaft 4. The mechanical transmission has a differential distributing the rotational movement to the drive wheels 8 of an axle. The drive wheels can be either front or rear wheels of the vehicle.

The motor shaft 4 includes a coupling element 10 that engages and disengages by a controlled actuator 12 controlled by a control unit 40, which can divide the motor shaft into an upstream part permanently connected to the combustion engine 2, and a downstream part also permanently connected to the drive wheels 8.

The coupling element 10 includes an engagement device, such as a mechanical coupling or clutch that actuates by controlled actuator 12.

The upstream part of motor shaft 4 permanently drives a first hydraulic machine 20, and the downstream part of the motor shaft permanently drives a second hydraulic machine 22. The two hydraulic machines 20, 22 that have variable displacement, are controlled by the control unit 40, and can be operated in either a pump mode or a motor mode.

The hydraulic machines 20, 22 are connected together to a high pressure circuit including a pressure accumulator 24, which maintains permanent pressure thanks to a membrane containing a gas under pressure. The high pressure circuit includes a high pressure sensor 26 measuring the charge pressure of the pressure accumulator 24.

The high pressure circuit connects to a hydraulic motor 28 with variable displacement that is controlled by the control unit 40, which runs at a predetermined speed and torque for optimization of the energy consumption of accessories 30. These accessories 30 include, in particular, an alternator, or a climate control compressor.

The hydraulic machines 20, 22 and the hydraulic motor 28 for the accessories connect to a low pressure circuit having a hydraulic reservoir 32 pressurized by the high pressure circuit. The pressurized hydraulic reservoir 32 maintains a minimum low pressure to eliminate cavitation problems in the aspiration of hydraulic machines 20, 22 when they are used as pumps.

In addition, the low pressure circuit includes a low pressure sensor 34. This allows the control unit to determine the quantity of energy available in the pressure accumulator 24, and the torque applied to the shaft of each hydraulic machine 20, 22 by determining the difference with the high pressure sensor 26.

The low pressure circuit also includes a filter 36 ensuring a certain purity level of the hydraulic fluid, and a heat exchanger 38 for cooling of the hydraulic fluid.

A pressure control valve 42 is interposed between the high and low pressure circuits to limit the maximum pressure difference between these two circuits.

Figure 2:
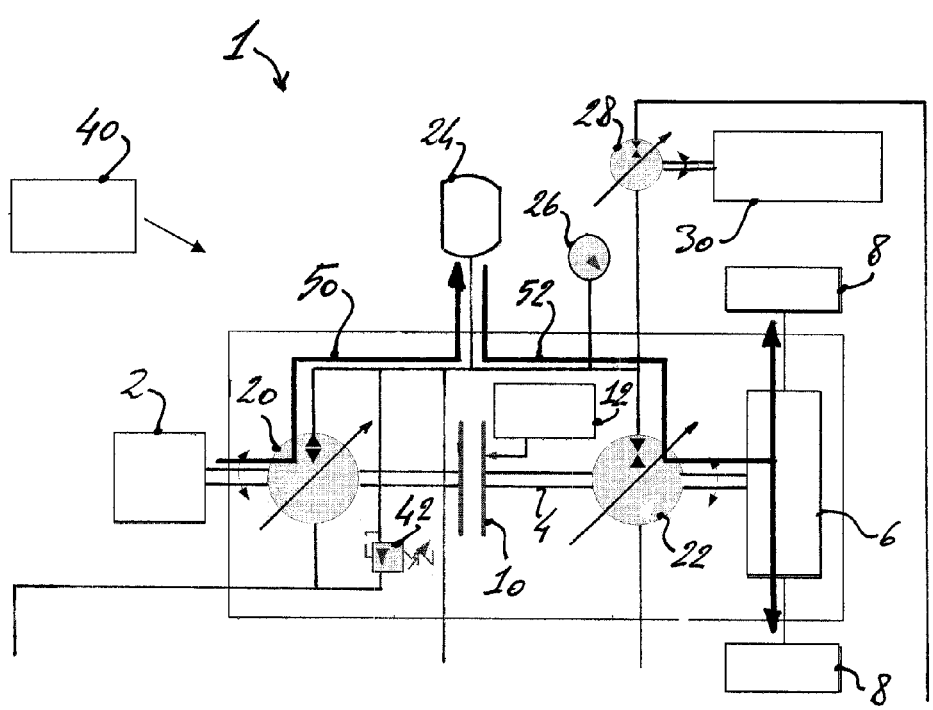
FIG. 2 is a partial diagram of the powertrain in a serial operating mode, partially showing the hydraulic circuit, and arranged to supply torque to the drive wheels.

FIG. 2 shows the power train in a serial operating mode, used generally for low power, such as about a few kilowatts. In the serial operating mode, the coupling element 10 disengages via the controlled actuator 12, thereby separating the two parts of the motor shaft 4.

The combustion engine 2 supplies power to the first hydraulic machine 20, which is used as pump to charge the pressure accumulator 24 as indicated by arrow 50. At the same time, the pressure accumulator 24 supplies a flow of pressurized fluid, indicated by arrow 52, thereby feeding the second hydraulic machine 22, which is used as motor, and which drives the drive wheels 8 of the vehicle with the transmission 6.

The control unit 40 permanently controls the displacement of the first hydraulic machine 20, and the operational characteristics of the combustion engine 2 through the intermediary of its engine controller, to optimize the operating point of the engine in order to obtain the best efficiency. In particular, combustion engine 2 is used intermittently for efficient delivery of high power, which is stored in the pressure accumulator 24 to be used afterwards in a progressive manner.

The high pressure sensor 26 indicates the maximum pressure in accumulator 24 whereby the combustion engine 2 and the charging of the accumulator are stopped, or a minimum pressure for restarting the engine and the recharging of the accumulator.

Similarly, the control unit controls the variable displacement of the second hydraulic machine 22 as a function of the required torque on the drive wheels 8, and the pressure difference between the high and low pressure circuits generating the torque.

When the combustion engine 2 stops, driving continues in pure hydraulic mode due to the flow supplied by the pressure accumulator 24, which is indicated by arrow 52, without emission of polluting gas.

Figure 3:
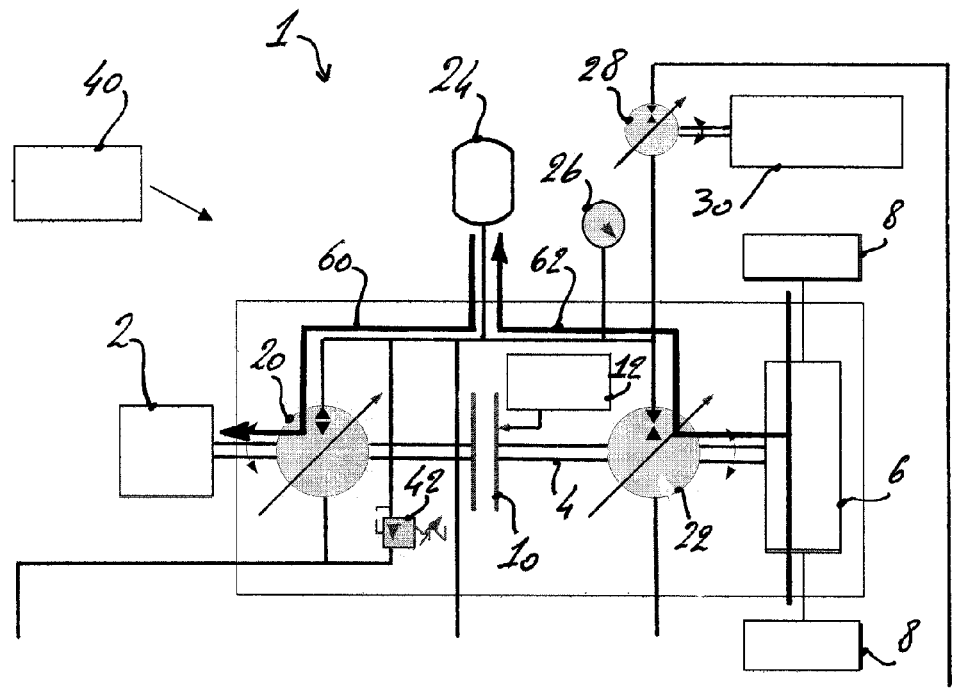
FIG. 3 is a partial diagram of the powertrain in a serial operating mode, configured for recovering energy, or for starting the combustion engine.

FIG. 3 is a diagram of the powertrain in a serial operating mode, arranged for recovering energy, or for starting the combustion engine 2.

During a deceleration of the vehicle, or when driving downhill, the kinetic energy of the vehicle can be recovered by adjusting the variable displacement of the second hydraulic machine 22 used as pump, which is driven by the drive wheels 8, to recharge the pressure accumulator 24, as indicated by arrow 62.

The variable displacement of the second hydraulic machine is adjusted as a function of the pressure difference between high and low pressure circuits. In this way, a braking torque is applied on the drive wheels 8, the power of which is modulated by regulation of the variable displacement hydraulic machine 22.

Energy also draws independently, as indicated by arrow 60, from the pressure accumulator 24 for driving the first hydraulic machine 20 used as motor, and for starting the combustion engine 2 when the vehicle starts driving, or automatically after stopping when the engine operates in a "Start-Stop" mode.

The variable displacement of the first hydraulic machine 20 also adjusts as a function of the pressure difference available between high and low pressure circuits, to obtain the necessary traction torque.

Figure 4:
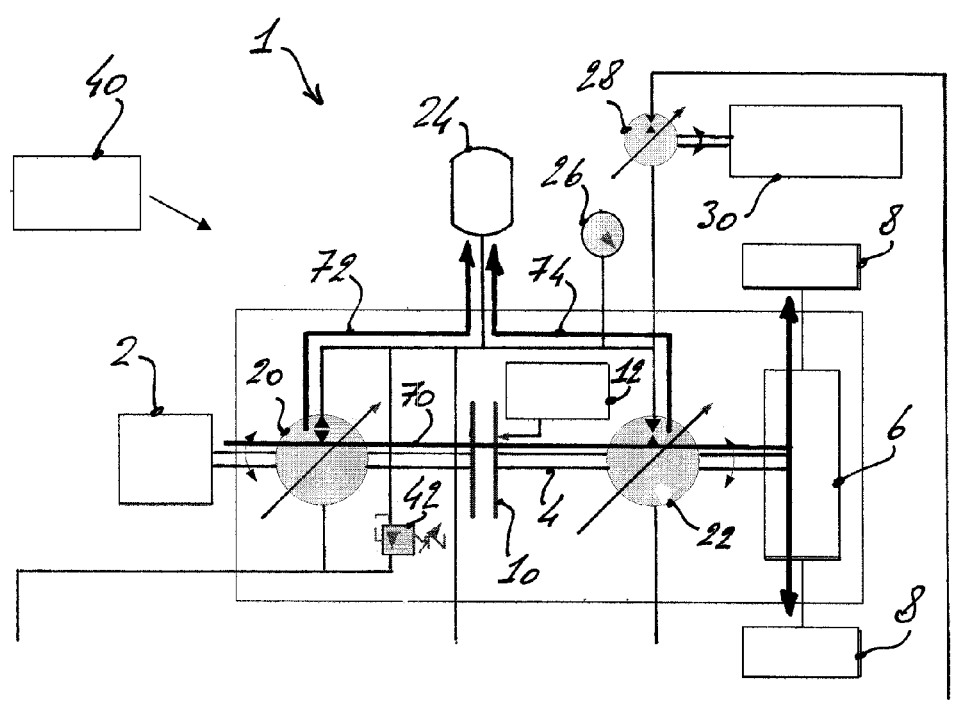
FIG. 4 is a partial diagram of the powertrain in a parallel operating mode, arranged for supplying torque to the drive wheels, and for recharging the pressure accumulators.

FIG. 4 shows the powertrain in a parallel operating mode, used generally for high power, such as greater than about a few kilowatts. The coupling element 10 is engaged by controlled actuator 12, connecting the two parts of motor shaft 4.

The combustion engine 2 supplies power directly to the drive wheels 8 through the motor shaft 4, as indicated by arrow 70. This direct mechanical link is used for high power with good efficiency. The transmission 6 can include several speed ratios, to adapt to the speed of the combustion engine 2 and improve the efficiency.

In parallel to the direct driving of the drive wheels 8 by motor shaft 4, the combustion engine 2 recharges the pressure accumulator 24 through the first hydraulic machine 20 used as pump, as indicated by arrow 72, and if necessary also through the second hydraulic machine 22 used as pump, as indicated by arrow 74.

The control unit 40 regulates the variable displacements of the hydraulic machines 20, 22 when operated as pumps to obtain the required power from these pumps. The control unit 40 also controls the torque of the combustion engine 2 in order for the engine to deliver the total power necessary for pumps 20, 22, and for the transmission 6 and the drive wheels 8.

When the pressure accumulator 24 is fully charged, the variable displacements of pumps 20, 22 are progressively brought to zero so that no fluid flows. In parallel, the torque required from the combustion engine 2 reduces in order not to disturb the smooth driving of the vehicle.

Figure 5:
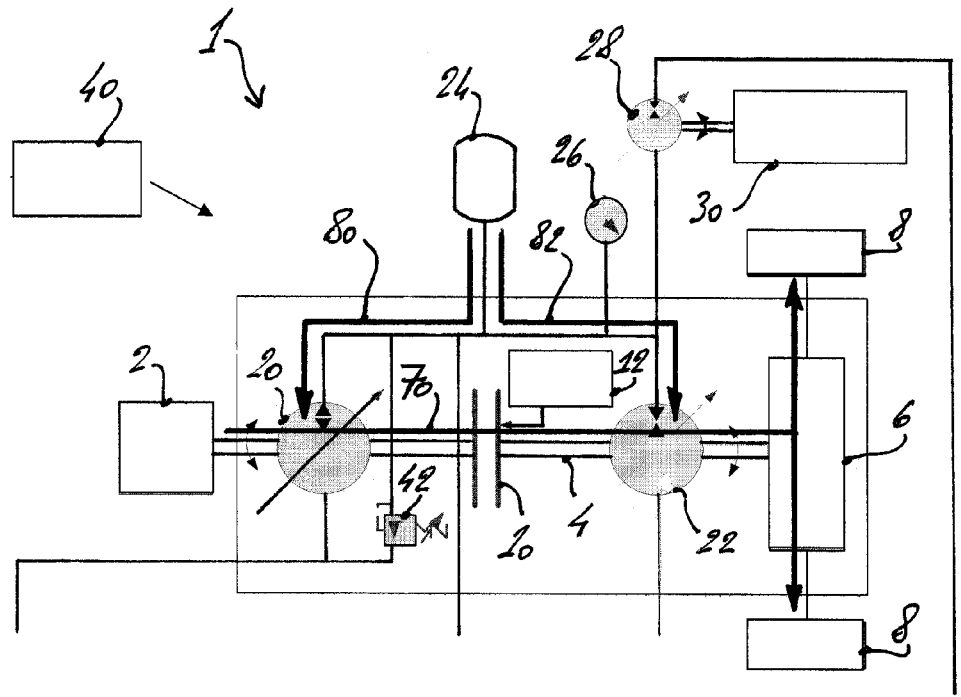
FIG. 5 is a partial diagram of the powertrain in a parallel operating mode, configured to supply torque to the drive wheels starting from the combustion engine and the pressure accumulator.

FIG. 5 shows an alternate embodiment of the parallel operating mode the powertrain operating in, where the motor shaft 4 receives, besides the power supplied by the combustion engine 2, complementary power delivered by one or both hydraulic machines 20, 22, which are functioning as motors. The energy draws from the pressure accumulator 24 as indicated by arrows 80, 82 and the variable displacements of the hydraulic motors 20, 22 are regulated based on the difference between high and low pressure circuits, and the power to be obtained.

The operating mode shown in FIG. 5 provides high drive power to the drive wheels 8, since the combustion engine 2 and the two hydraulic machines 20, 22 are adding their power to give the vehicle the highest acceleration. This operating mode occurs when energy is available in the pressure accumulator 24, and the torque requirement is higher than what the combustion engine 2 alone can deliver.

Figure 6:
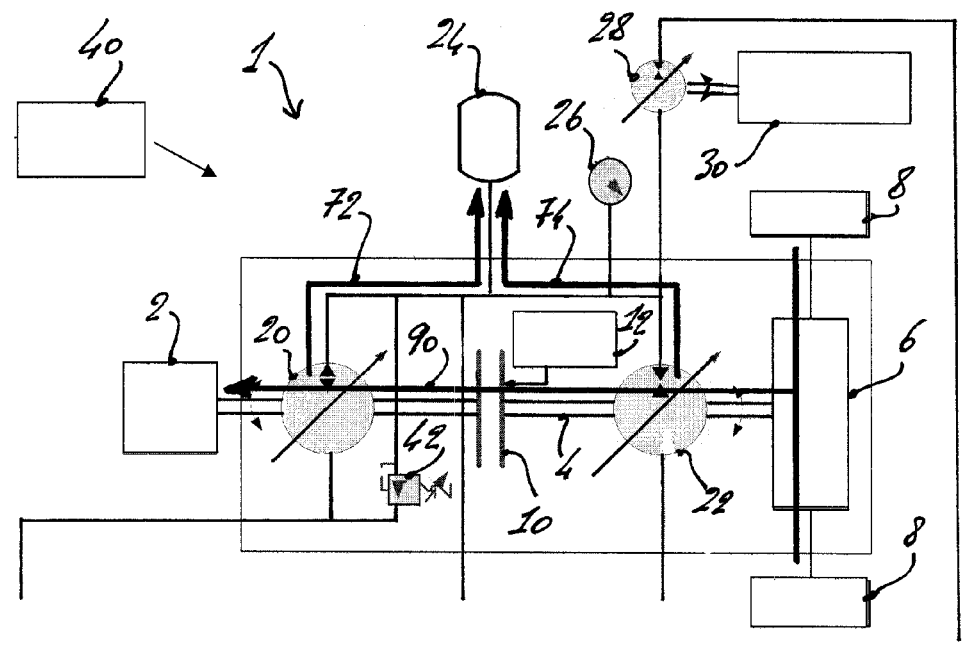
FIG. 6 is a partial diagram of the powertrain in a parallel operating mode, configured to recover energy.

FIG. 6 shows another alternate embodiment of a parallel operating mode of the powertrain, where the driver wants to brake the vehicle.

One of the two hydraulic machines 20, 22 is used as a pump, or in case of heavy braking, both hydraulic machines 20, 22 are used as a pump. In this operating mode, the hydraulic machines have their variable displacement adjusted in order to obtain a torque on motor shaft 4 as a function of the difference between high and low pressure circuits, which brakes the drive wheels as needed.

In this case, the combustion engine 2 is also driven, and delivers a braking torque which is additive to the torque of the hydraulic machines 20, 22.

When the pressure in the accumulator 24 rises, and for constant braking requirements, the displacement of the hydraulic machines 20, 22 gradually and proportionally reduces to maintain the braking torque. When the pressure accumulator 24 is fully charged, the control unit gradually brings the displacements to zero volume, and actuates the wheel brakes of the vehicle, which take over automatically in progressive manner to maintain comfort and safety.

When the pressure accumulator 24 is fully charged, and in case of accidental overcharging of the accumulator, the pressure control valve 42 sends the high pressure fluid through a bypass to the low pressure circuit.

In general, the control unit 40 continuously adapts the variable displacements of the hydraulic machines 20, 22 to continually adjust as a function of the difference between high and low pressure circuits, and the desired torque on the shafts of the hydraulic machines when functioning as motors or pumps. These adaptations are always coordinated with the actions of the combustion engine 2 to set the torque supplied by the engine, or on the wheel brakes to set the braking levels, so as to obtain smooth driving and reduce polluting emissions.

The control unit 40 can be a separate unit linked to the control unit of the combustion engine 2, or can be integrated in the control unit of the combustion engine. The combustion engine is designed to be used in a reduced operating range, without any particular dynamic demands. It can be simplified and optimized for this range, and its cost can be reduced.

Since the braking of the vehicle is in part assured by the hydraulic machines, the wheel braking means dissipate less energy and have less wear. They can also be simplified.

Changes can be made in the above constructions without departing from the scope of the disclosure, it is intended that all matter contained in the above description or shown in the accompanying drawings shall be interpreted as illustrative and not in a limiting sense.

The invention claimed is:

1. A powertrain for a hybrid vehicle having drive wheels, comprising:
   a combustion engine;
   a drive shaft connected at one end to said combustion engine to be driven by said combustion engine and operatively connected at a second end to said drive wheels;
   a coupler in said drive shaft, said coupler dividing said drive shaft into a first part connected to said combustion engine and a second part operatively connected to said drive wheels; said coupler being switchable between an engaged mode in which said first and second parts of said drive shaft are connected and a disengaged mode in which said first and second parts of said drive shaft are independent of each other;
   a first variable displacement hydraulic machine connected to said drive shaft first part such that said first variable displacement hydraulic machine is driven by, or can drive, said shaft first part;
   a second variable displacement hydraulic machine connected to said drive shaft second part to be driven by, or to drive, said drive shaft second part; and
   a hydraulic pressure accumulator which stores energy, said first and second hydraulic machines being in fluid communication with said pressure accumulator;

a hydraulic circuit comprising said first and second variable displacement pumps and said hydraulic pressure accumulator; said hydraulic circuit defining a high pressure circuit and a low pressure circuit;

a high pressure sensor in said high pressure circuit;

a low pressure sensor in said low pressure circuit; and a control unit; said controller receiving signal from said high and low pressure sensors indicative of the pressure in said high and low pressure circuits, respectively;

wherein the first and second variable displacement hydraulic machines are each operable in a pump mode to charge said pressure accumulator and a drive mode to drive said first and second portions, respectively, of said drive shaft; and whereby when said coupler is in its said engaged mode, said first and second hydraulic machines are operated in parallel and are operable to both drive said wheels or both charge said accumulator; and when said coupler is in its said disengaged mode, said first hydraulic machine is operable to charge said accumulator or drive said shaft first part to operate as a starter for said engine and said second hydraulic machine is operable to charge said accumulator or drive said shaft second part to drive said wheels; and wherein control unit is configured for regulation of the displacement of each hydraulic machine used as a motor or as a pump as a function of the desired torque on its shaft and the pressure difference between high and low pressure circuits supplying the respective hydraulic machine.

2. The powertrain according to claim 1, the coupling element comprising an engagement device actuated by a controlled actuator commanded by said control unit.

3. The powertrain according to claim 1, wherein a high pressure circuit of one of the first and second hydraulic machines connects to a variable displacement hydraulic motor which is controlled by the control unit to drive accessories.

4. A hybrid vehicle with a powertrain, wherein the powertrain is constructed according to claim 1.

5. The powertrain of claim 1 wherein said powertrain can be operated in:

a first serial operating mode in which said coupler is in its disengaged mode; said first hydraulic machine is driven by said engine to charge the pressure accumulator; said pressure accumulator supplies pressurized fluid to said second hydraulic machine, and said second hydraulic machine is operated as a motor to drive said drive wheels; or a second serial operating mode in which said coupler is in its disengaged mode; and said second hydraulic machine is operatively driven by said drive wheels to charge said pressure accumulator; or a first parallel operating mode in which said coupler is in its engaged mode such that said engine provides torque to said drive wheels via said drive shaft; and in which one or both of said first and second hydraulic machines receives pressurized fluid form said pressure accumulator to be operated as a motor to provide torque to said drive wheels; or a second parallel operating mode in which said coupler is in its engaged mode and in which said drive wheels operatively drive one or both of said hydraulic machines, such that said hydraulic machines are operated in the pump mode to charge said pressure accumulator and to apply a braking torque and in which the engine is also driven by the drive wheels to also deliver a braking toque.

6. The powertrain of claim 5 wherein, in said second serial operating mode, said pressure accumulator supplies pressurized fluid to said first hydraulic machine and said first hydraulic machine is operated as a motor to start said engine.

7. The powertrain of claim 1 wherein said low pressure circuit further includes a hydraulic reservoir.

8. A method for operating a powertrain for a hybrid vehicle having drive wheels, the power train comprising:

a combustion engine;

a drive shaft connected at one end to said combustion engine to be driven by said combustion engine and operatively connected at a second end to said drive wheels;

a coupler in said drive shaft, said coupler dividing said drive shaft into a first part connected to said combustion engine and a second part operatively connected to said drive wheels; said coupler being switchable between an engaged mode in which said first and second parts of said drive shaft are connected and a disengaged mode in which said first and second parts of said drive shaft are independent of each other; and a hydraulic circuit comprising:

a first variable displacement hydraulic machine connected to said drive shaft first part such that said first variable displacement hydraulic machine is driven by, or can drive, said shaft first part;

a second variable displacement hydraulic machine connected to said drive shaft second part to be driven by or to drive said drive shaft second part; and a hydraulic pressure accumulator which stores energy, said first and second hydraulic machines being in fluid communication with said pressure accumulator;

the hydraulic circuit comprising a high pressure circuit and a low pressure circuit;

the method comprising the steps of:

selectively switching the coupling element between an engaged position in which the engine is connected to the wheels and a disengaged position in which the engine is not connected to the wheels; and controlling a hydraulic circuit such that the first and second hydraulic machines are selectively switched between a parallel mode in which the first and second hydraulic machines operate in parallel and a serial mode in which the first and second hydraulic machines operate in series;

sensing the pressure in the high pressure circuit and the low pressure circuit;

wherein in the serial mode, the coupling element is in said disengaged position, and a control unit controls the variable displacements of the first hydraulic machine used as pump and of the second hydraulic machine used as motor; and wherein in parallel mode the coupling element is in said engaged position and said first and second hydraulic machines are both used as motors or are both used as pumps; and regulating the displacement of each hydraulic machine when used as a motor or as a pump as a function of the desired torque on its shaft and the pressure difference between high and low pressure circuits supplying the respective hydraulic machine.

9. The method for operating a powertrain according to claim 8, wherein in parallel operating mode, the coupling element is engaged, and a control unit regulates the variable displacements of the first and second hydraulic machines.

10. The method for operating a powertrain according to claim 9, including simultaneously using of the first and second hydraulic machines to deliver either high traction torque, or high braking force to the drive wheels.

* * * * *